(12) United States Patent
Kazmi et al.

(10) Patent No.: US 9,438,521 B2
(45) Date of Patent: Sep. 6, 2016

(54) METHOD AND ARRANGEMENT IN A TELECOMMUNICATION SYSTEM

(75) Inventors: Muhammad Ali Kazmi, Bromma (SE); Tarmo Kuningas, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1681 days.

(21) Appl. No.: 12/443,198

(22) PCT Filed: Sep. 27, 2007

(86) PCT No.: PCT/SE2007/050682
§ 371 (c)(1),
(2), (4) Date: Dec. 22, 2009

(87) PCT Pub. No.: WO2008/041929
PCT Pub. Date: Apr. 10, 2008

(65) Prior Publication Data
US 2010/0091667 A1   Apr. 15, 2010

(30) Foreign Application Priority Data
Oct. 3, 2006 (SE) ..................... 0602079

(51) Int. Cl.
*H04L 12/801* (2013.01)
*H04W 28/12* (2009.01)
*H04L 12/26* (2006.01)
*H04W 24/10* (2009.01)
*H04W 92/04* (2009.01)
*H04W 92/12* (2009.01)

(52) U.S. Cl.
CPC .......... *H04L 47/14* (2013.01); *H04L 43/0829* (2013.01); *H04L 43/16* (2013.01); *H04L 47/115* (2013.01); *H04L 47/35* (2013.01); *H04W 28/12* (2013.01); *H04L 43/028* (2013.01); *H04W 24/10* (2013.01); *H04W 92/045* (2013.01); *H04W 92/12* (2013.01)

(58) Field of Classification Search
None
See application file for complete search history.

(56) References Cited

U.S. PATENT DOCUMENTS

| | | | |
|---|---|---|---|
| 6,219,343 B1 * | 4/2001 | Honkasalo et al. | 370/335 |
| 6,397,359 B1 * | 5/2002 | Chandra et al. | 714/712 |
| 6,765,864 B1 * | 7/2004 | Natarajan et al. | 370/224 |
| 2001/0018342 A1 * | 8/2001 | Vialen et al. | 455/423 |
| 2001/0036180 A1 * | 11/2001 | Kato et al. | 370/386 |
| 2002/0120708 A1 * | 8/2002 | Mizukami | 709/213 |
| 2002/0181394 A1 * | 12/2002 | Partain et al. | 370/229 |
| 2003/0060209 A1 * | 3/2003 | Bruin et al. | 455/452 |
| 2003/0095552 A1 * | 5/2003 | Bernhard et al. | 370/395.21 |

(Continued)

FOREIGN PATENT DOCUMENTS

| | | |
|---|---|---|
| EP | 1503606 A1 | 2/2005 |
| WO | 03/055167 A1 | 7/2003 |

*Primary Examiner* — Huy D Vu
*Assistant Examiner* — James P Duffy
(74) *Attorney, Agent, or Firm* — Coats & Bennett, P.L.L.C.

(57) ABSTRACT

The present invention relates to resource management in a telecommunication system. In particular the invention relates to detection and estimation of transport network load and optimization of transport network resources. According to the method and arrangement of the invention a serving node engaged in admission control identifies a transport network interface from which transport load measurements are required for the admission control, and a target radio network node related to the identified transport network interface. The serving radio network node configure the target radio network node to perform and report measurements on the transport network interface.

29 Claims, 4 Drawing Sheets

(56) References Cited

U.S. PATENT DOCUMENTS

| | | | |
|---|---|---|---|
| 2003/0142625 A1* | 7/2003 | Wan et al. | 370/235 |
| 2004/0063434 A1* | 4/2004 | Hamalainen et al. | 455/450 |
| 2004/0166835 A1 | 8/2004 | Johansson et al. | |
| 2005/0249148 A1 | 11/2005 | Nakamata et al. | |
| 2006/0067270 A1* | 3/2006 | Gilliland et al. | 370/329 |
| 2006/0234638 A1 | 10/2006 | Mueckenheim et al. | |
| 2007/0155390 A1* | 7/2007 | Kodikara Patabandi et al. | 455/450 |
| 2007/0206548 A1* | 9/2007 | Toskala et al. | 370/338 |
| 2008/0056125 A1* | 3/2008 | Kneckt et al. | 370/229 |

* cited by examiner

METHOD AND ARRANGEMENT IN A TELECOMMUNICATION SYSTEM

FIELD OF THE INVENTION

The present invention relates to resource management in a telecommunication system. In particular the invention relates to detection and estimation of transport network load and optimization of transport network resources.

BACKGROUND

Mobile telecommunication systems can offer high bit rate services. The demand is increasing and believed to increase even further in the future. To meet the demand and at the same time build systems that are justified from an economic perspective, and from the perspective of usage of limited resources such as radio bandwidth, is a challenge. In the area of radio resources several techniques are in use, or proposed, to achieve an efficient radio resource management (RRM). The description of prior art and also the invention will have a starting point in the present mobile communication system referred to as UTRAN. UTRAN stands for UMTS Terrestrial Radio Access Network, and UMTS for Universal Mobile Telecommunication Communication System. The references to UTRAN and evolutions of UTRAN should be seen as non-limiting example.

In the evolutions of the present mobile communication systems, often referred to as E-UTRAN (Evolved UTRAN) several different radio resource management (RRM) techniques are introduced to meet the high target bit rate requirements. Typical example of RRM functions that will be used in E-UTRAN are admission control, handovers, inter-cell interference coordination and avoidance, load balancing etc. In E-UTRAN, these RRM functions are executed in a distributed manner. This means they reside inside the base station, in UTRAN refereed to as Node B and in E-UTRAN eNode B. In the following these terms are used interchangeably. The efficient execution of RRM functions requires a number of measurements as input to RRM algorithms. Several of these measurements may be performed internally by the Node B itself. However, some measurements results are to be reported to the Node B either from other neighboring Node Bs or from other network nodes such as access gateway.

One important RRM function is the radio admission control or simply admission control. In E-UTRAN admission control will be performed at the eNode B where all radio resource related information resides, see 3GPP TS 25.912. As stated in TS 25.912, the admission control process should take into consideration the overall resource situation in a cell of the communication system. For simplicity the overall resources can be classified into three main categories:

Hardware resource usage
Radio resource usage
Transport network resource usage

The radio resources include downlink transmitted power, downlink channelization code usage and uplink received total wideband power (RTWP). The transport network includes the resources on the fixed part of the radio access network, namely X2 (Node B—Node B interface) and S1 (Node B—access gateway (AGW) interface) interfaces. Both X2 and S1 interfaces are further split into user and control planes, i.e. X2-U/X2-C and S1-U/S1-C respectively.

It is important to note that admission control refers to the admitting of radio bearers (or calls or connections) at call setup as well as at handover (i.e. on going connections).

Due to the location of the admission control at the Node B, the usage of the first two sets of resources, hardware and radio resources, can be internally determined by the Node B itself. Similarly the transport network load (i.e. load on S1 and X2) in the downlink can also be internally determined in the Node B. However, equally important is the uplink transport network load, which needs to be signaled to the serving eNode B for the purpose of admission decisions.

In WCDMA the admission control decision generally considers the availability of radio resources such as transmitter carrier power, RTWP and channelization code. This is because the radio resources are generally assumed to be the major bottleneck. The transport network resources are on the other hand believed not to be the limiting factor. This is further based on the assumption that operators have sufficient capacity on the fixed interfaces such as Iub (Node B—RNC interface) or Iur (RNC-RNC interface) to admit new radio bearers provided radio resources are available. On the contrary the radio bearers can be blocked or dropped due to insufficient transport network resources, i.e. lack of resources on S1 and X2 interfaces in E-UTRA, wherein S1 is the main bottleneck, or Iub/Iur in UTRA. This is especially due to the fact that over the last few years in UTRAN due to the introduction of sophisticated radio network techniques and advanced UE receivers the bit rate over the radio interface has increased dramatically from 384 kbps to several Mbps. For efficient end-to-end performance the resource allocation on transport network level should match with the resource assignment on the radio interface.

In WCDMA admission control is done in the RNC. This means that uplink transport network load on Iub (Node B—RNC) can be internally measured in the RNC while downlink transport network load on Iub (RNC—Node B), which should be measured in the Node B, should be reported to the RNC. However, currently there is no detailed reporting of downlink transport network load from Node B to RNC. Similarly there is no reporting of uplink transport network load on Iur interface (RNC-RNC) from the target RNC to the serving RNC. Only 'congestion status' based on frame loss or delay at transport network is reported by SRNC to Node B, see 3GPP TS 25.427, "UTRAN Iur/Iub interface user plane protocol for DCH data streams".

Although this allows a Node B to reduce the data rate in case there is congestion, the congestion indication estimation is also implementation dependent. Due to the lack of a detailed reporting mechanism, the congestion status reporting is insufficient for an efficient admission control.

SUMMARY OF THE INVENTION

Due to the above mentioned limitations, experience from the past and considering the complexity of the evolved UTRAN system, TR 25.912 specifies the need for having a mechanism to detect the transport network load. TR 25.912 for S1-U interface, specifies the requirement of means to minimize packet losses due to mobility and also a packet loss detection mechanism.

Similarly for X2-U it is stated in TR 25.912 that means to minimize packet losses due to mobility is required. There is special emphasis on S1-U load measurement and reporting mechanism since S1-U is the main limiting factor. However the invention is equally valid for other interfaces, such as X2-U and Iub and Iur interfaces in WCDMA. The problem associated with the previously known technique is thus that the known type of congestion status reporting is insufficient for detecting the transport network load in order to e.g. achieve an efficient admission control.

The object of the present invention is to overcome these drawbacks of the prior art method and arrangements. This is achieved by the method as defined in claim 1 and the radio network node as defined in claim 24.

The present invention therefore relates to detection of the load on transport network interfaces. More specifically, the invention relates to a method in a radio network node for detecting the load on transport network interfaces, comprising the steps of configuring a target node to measure the transport network load by configuring a set of parameters and reporting conditions in order to enable the target node to perform the measurements based on said set of parameters; and receiving the measurement results from the target node when the reporting conditions are fulfilled.

The transport network load estimation is used as an input for some fundamental radio resource management (RRM) functions such as admission control, handovers, load balancing etc. In this way the usage of transport network resources is optimized.

The transport network load is preferably expressed in terms of packet loss rate. The missing sequence numbers of the transmitted packets can be used to measure the packet loss rate.

According to an embodiment of the invention, the transport network load is separately measured for each transport network bearer service. Alternatively, the transport network load is separately measured for each group of transport network bearer services with similar characteristics such as quality of service requirements. In yet another alternative, the transport network load is measured as an aggregation of all the transport network bearer services.

The parameters that are configured at the target node can include basic measurement interval, measurement filtering length, reporting condition and transport bearer or flow type. Said parameters and reporting conditions can be default values, which are configured in a static way by operation and management system, or can be configured by the network node requesting measurement reports. The measurement filtering can comprise the number of successive measurement intervals, minimum number of packets to be measured in each interval and whether filtering averaging is linear or non-linear. The reporting condition can comprise the number of measurement intervals with at least N packets and the packet loss rate threshold, above which, measurement should be reported. Further can the flow type, constituted by transport bearer service, a group of transport bearer or aggregated flow for which the measurement is done, be specified.

According to one specific embodiment of the invention, the radio network node requesting measurement is a base station and said target node is an access gateway in evolved UTRAN, whereby the uplink transport network load on the interface between the base station and the access gateway is measured at the access gateway and reported to the base station.

Alternatively, the requesting radio network node is an access gateway in evolved UTRAN and said target node is a base station, whereby the downlink transport network load on the interface between base station and the access gateway in evolved UTRAN is measured at the base station and reported to the access gateway.

Alternatively, the requesting radio network node is a first base station and said target node is a second base station, whereby the transport network load on the interface between base stations is measured at the target base station and reported to base station requesting the measurement.

Alternatively, the requesting radio network node is an MBMS access gateway or MBMS server in evolved UTRAN and said target node is a base station, whereby the downlink transport network load on the interface between base station and the MBMS access gateway or MBMS server is measured at the base station and reported to the MBMS access gateway or MBMS server.

Alternatively, the requesting radio network node is a base station and said target node is an MBMS access gateway or MBMS server in evolved UTRAN, whereby the uplink transport network load on the interface between base station and the MBMS access gateway or MBMS server in evolved UTRAN is measured at the MBMS access gateway or MBMS server and reported to the base station.

Alternatively, the requesting radio network node is a radio network controller in UTRAN and said target node is a base station, whereby the downlink transport network load on the interface between the base station and the radio network controller is measured at the base station and reported to the radio network controller.

The reported transport network load measurement in conjunction with other measurements, can be used for admission control of new radio bearers.

According to a specific embodiment of the invention, said reporting condition comprises a threshold above which measurements should be reported, whereby the reporting of measurement is event-triggered.

The invention further relates to a radio network node comprising means for:

configuring a target node to measure the transport network load by configuring a set of parameters and reporting conditions in order to enable the target node to perform the measurements based on said set of parameters;

receiving the measurement results from the target node when the reporting conditions are fulfilled.

The invention further relates to a radio network node comprising means for receiving configuration parameters and reporting conditions from a network node requesting measurement;

performing said measurement based on said set of parameters;

reporting the measurement results to the requesting network node when the reporting conditions are fulfilled.

Thanks to the method and arrangement according to the present invention, a serving radio network node is provided a complete picture of the congestion situation in the network, whereby network nodes that perform admission control have better control over the congestion reporting mechanism.

One advantage is that existing nodes can be configured to perform and to report requested measurements, and no specific measurement equipment is needed.

A further advantage of the invention is that the transport load measurements can be used to gather long term statistics regarding load and congestions in the radio network. This can be used by to identify "bottlenecks" in the different interfaces in the communication network and for general planning and maintenance of the network.

Embodiments of the invention are defined in the dependent claims. Other objects, advantages and novel features of the invention will become apparent from the following detailed description of the invention when considered in conjunction with the accompanying drawings and claims.

BRIEF DESCRIPTION OF THE DRAWINGS

Preferred embodiments of the invention will now be described with reference to the accompanying drawings, wherein.

DESCRIPTION

Figure 1:
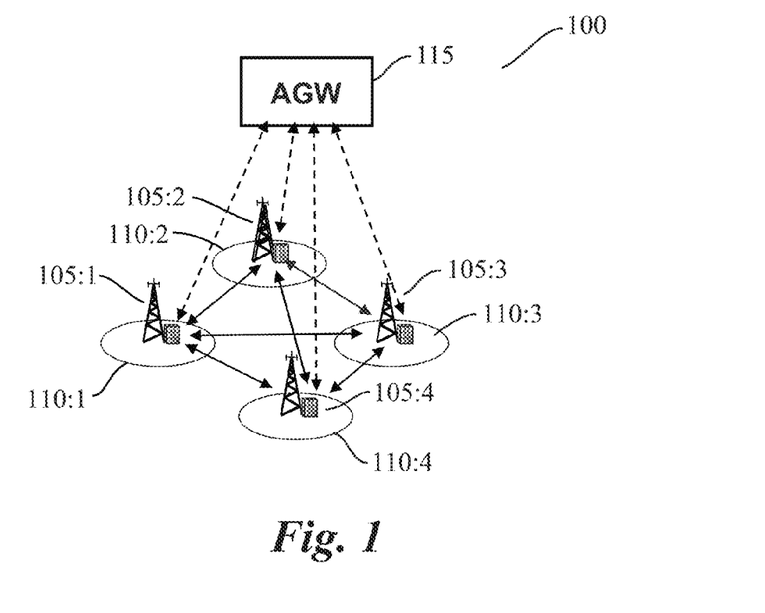
FIG. 1 illustrates the E-UTRAN radio access network architecture.

A part of a telecommunication system wherein the method and arrangement according to the present invention may be implemented is schematically illustrated in FIG. 1. A communication system in compliance with E-UTRAN is used as a non-limiting example. In the communication system 100 a plurality of base stations, or Node B/eNode B 105:1-4 serves respective cells 110:1-4. The Node Bs are connected to an access gateway (AGW) 115. The transport network communication may be between the Node Bs 105:1-4, indicated with solid arrows, or between one of the Node B and the AGW, indicated with dashed arrows. In E-UTRAN the interfaces are referred to as X2 (X2-U/X2-C) and S1 (S1-U/S1-C, and the transport network load is in this non-limiting example represented by the load on these interfaces. In the E-UTRAN implementation node B's 105:1-4 have the responsibility for the RRM functions, for example admission control. In the following the term admission control is used and meant to encompass all type of functionality wherein a node requires transport load information in order to determine the conditions for a communication session.

Figure 2A:
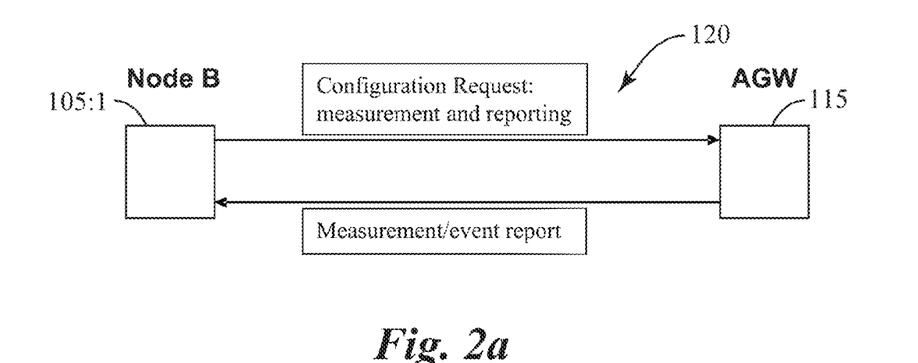
FIG. 2a is a flowchart and 2b a signaling scheme illustrating the method according to the invention.
Figure 2B:
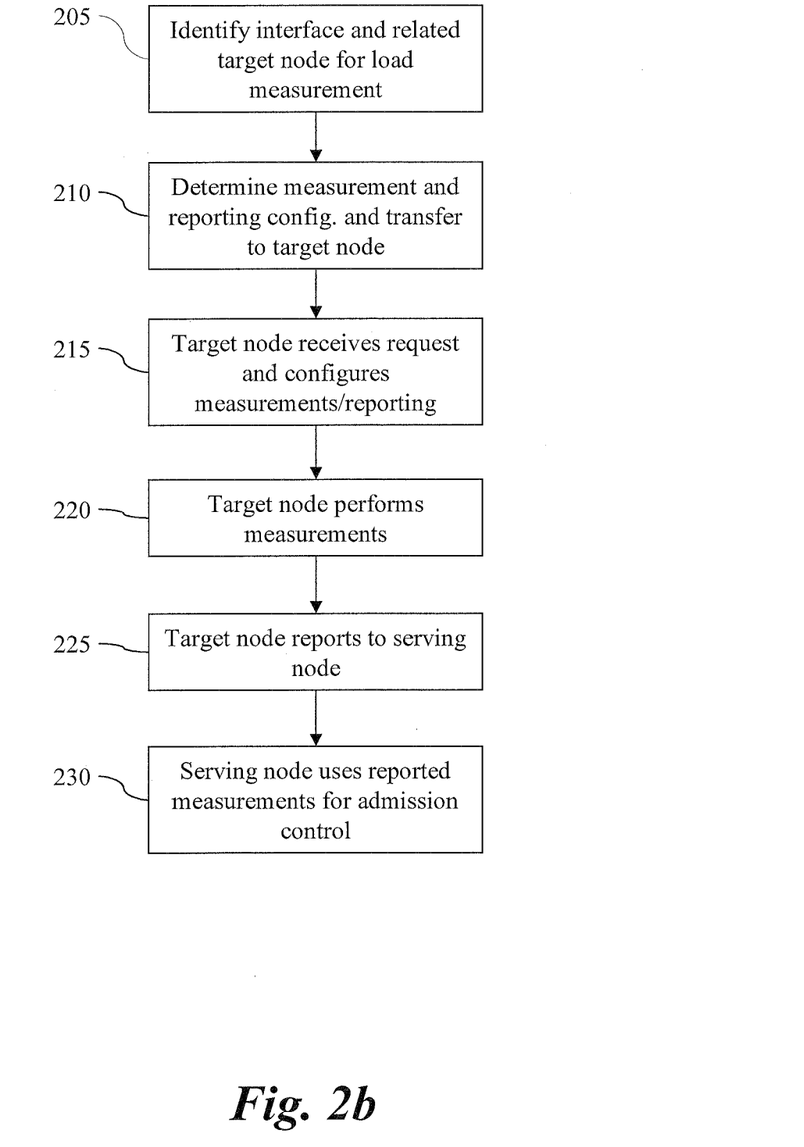

The method according to the invention is illustrated in the flowchart of FIG. 2b and by the signaling scheme of FIG. 2a, and comprises the steps of:

205: A serving radio network node, for example the node B 105:1, responsible for admission control identifies a transport interface 120 for which information on transport load is required, and a target radio network node, for example AGW 115 associated with the transport interface 120.

210: The serving radio network node determines a measurement configuration request, specifying measurement and reporting instructions, and transfers the measurement configuration request to the target radio network node.

215: The target radio network node receives the measurement configuration request and adapts its measurement and reporting functions accordingly.

220: The target radio network node performs measurements according to the instructions in the received measurement configuration request.

225: The target radio network node reports measurements to the serving radio network node according to the instructions in the received measurement configuration request.

230: The serving radio network node performs admission control at least partly based on the reported measurements.

A target radio network node, for example the AGW 115 in FIG. 1, is typically connected to a plurality of serving radio network nodes, node Bs, and is therefore preferably adapted to receive and simultaneously handle measurement configuration requests from the plurality of serving radio network nodes.

Examples of measurement methods, measurement configurations, and measurement reports, representing embodiments of the invention, will be given below.

Measurement Methods

The transport load on the interfaces may be determined in a variety of ways. The data transported on the transport interfaces is divided into data packets according to the protocol relevant to that interface. The protocols typically provides means for detecting data packet loss. The data packets may for example include sequence numbers and acknowledgement procedures (ACK/NACK-procedures) used to ensure the quality of the transport, and to detect data packet loss by observing the missing sequence numbers. Such methods are known in the art. It is proposed in 3GPP, R3-061203, "Sequence numbers on S1 and X2" that the transport bearer specific S1-U and X2-U sequence numbers are used to detect the packet loss. The packet loss rate per radio bearer type can be measured and reported to the Node B. Hence, packet loss detection on S1-U is a suitable performance metric to depict the transport network load on S1-U interface. Similarly, the packet loss detection on X2-U is a suitable performance metric to depict the transport network load on X2-U interface.

Measurement Configuration

In step 205 of the method the serving radio network node, determines the measurement configuration request, specifying aspects of the measurement and reporting mechanism, to be carried out by the target radio network node. Sufficient confidence interval is necessary for reliable packet loss rate measurement. e.g. measurement time, number of packets to be considered in the measurement interval etc. This requires the serving radio network node to specify a number of parameters for measurement and reporting condition.

Following main categories of parameters may be specified by the serving radio network node in the measurement configuration request:

Basic measurement interval ($T_m$)
Measurement filtering aspects
Reporting condition
Flow type (e.g. best effort, real time, etc)

Figure 3:
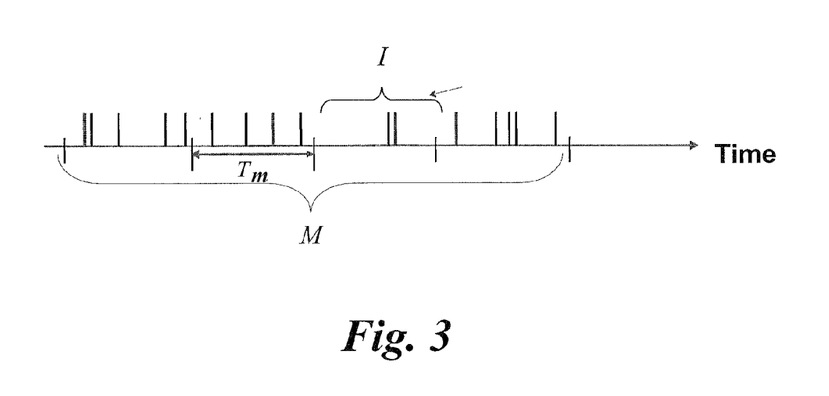
FIG. 3 illustrates packet loss rate measurement and filtering.
Figure 4:
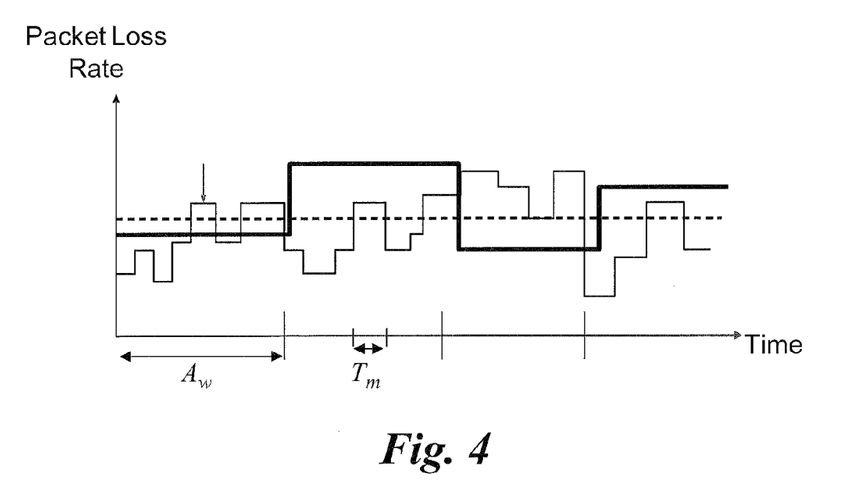
FIG. 4 illustrates event triggered packet loss rate reporting.

One basic aspect of the filtering is the number of successive measurement intervals, M, to get an average value as shown in FIG. 3, wherein also the basic measurement interval $T_m$ is illustrated. The filtering is dependent on the successive measurement intervals (M) and by setting M=1, the filtering can be disabled. The average can be linear or non-linear. Another filtering parameter is the minimum number of packets to be measured in each interval N, and a measurement interval with too few packets, interval I in FIG. 4, is ignored.

The reporting condition or reporting event can be specified by setting:

Number of measurement intervals with at least N packets, L

Packet loss rate threshold, γ, above which, measurement should be reported.

The measurement is reportable for each service or flow, i.e. transport bearer specific, or for a group of services. This may be specified by the serving radio network node.

The packet loss rate may preferably be the ratio of packets loss to total number of packets transmitted during interval $T_m$. The average packet loss will be obtained by filtering it over the entire configured period.

Measurement Reporting Mechanism

The serving radio network node can request the target node to report the average packet loss rate either periodically or in an event triggered fashion. In the periodic reporting case, the AGW will report the average packet loss rate after every M measurement intervals. On the other hand the event triggered reporting will be done provided e.g. the following conditions are met.
1. Average packet loss rate becomes higher than the previously specified threshold, $\gamma$.
2. Minimum N packets are measured in at least any L out of M successive time intervals, where each time interval is $T_m$.

This means there is no event reporting in case fewer packets are transmitted since condition 2) is violated. This could also indicate there is no congestion.

FIG. 4 illustrates the overall event triggered measurement reporting mechanism of the average packet loss rate as the variation of packet loss rate versus time. The thin solid line indicates packet loss rate, PRL, per measurement interval, and $T_m$, the thick solid line the average PLR for successive average windows $A_w$. The dashed line indicates the pre-determined threshold value $\gamma$. The figure shows that the packet loss rate measured at the target node could instantaneously exceed the threshold set by the node, which requests the measurement. But the target node will report any measurement or event only if the average packet loss rate measured over the interval specified by the requesting node exceeds the threshold. This will on the one hand reduce unnecessary reporting. It will also ensure that the reported results are more reliable. This prevents "ping-pong effects"—the admission control decisions are preferably based on long term radio and transport network behaviour, which is better depicted by the average results with good confidence interval.

In the example previously described, relating to E-UTRAN, it is the Node B that configures the AGW for the measurement and reporting of uplink S1-U load as shown in FIG. 2b. This example is of high interest because S1 is believed to be the main bottleneck in the transport network as it carries the user data between the base stations and the core network. However, the invention is equally applicable to downlink packet loss rate reporting from Node B to the AGW. In this case if the AGW requires downlink transport load over Si then it can specify the parameters described in the foregoing.

In a further example, also relating to E-UTRAN, an Node B (serving) configures another Node B (target) to measure and report the transport load on the X2 interface between the nodes. Si or similar interface between Node B and MBMS gateway (or MBMS server) in E-UTRAN may also be characterized using the method of the invention.

In all the above cases the measurement is generally reported to the target node via a control plane such as S1-C in E-UTRAN, for example S1 interface comprises of S1-U and S1-C. The former carries user data is therefore more loaded and is therefore also the target for measuring the actual transport network load. Another possibility is to multiplex or embed the measurement reports with user data blocks or frames. This method is called piggy-backing. The advantage is that it requires less overheads compared to the reporting via separate control channel. However, piggy-back suffers from the flaw that it can only carry reports if there is user data. Therefore, the most reliable way is to send the reports via the control plane.

Figure 5:
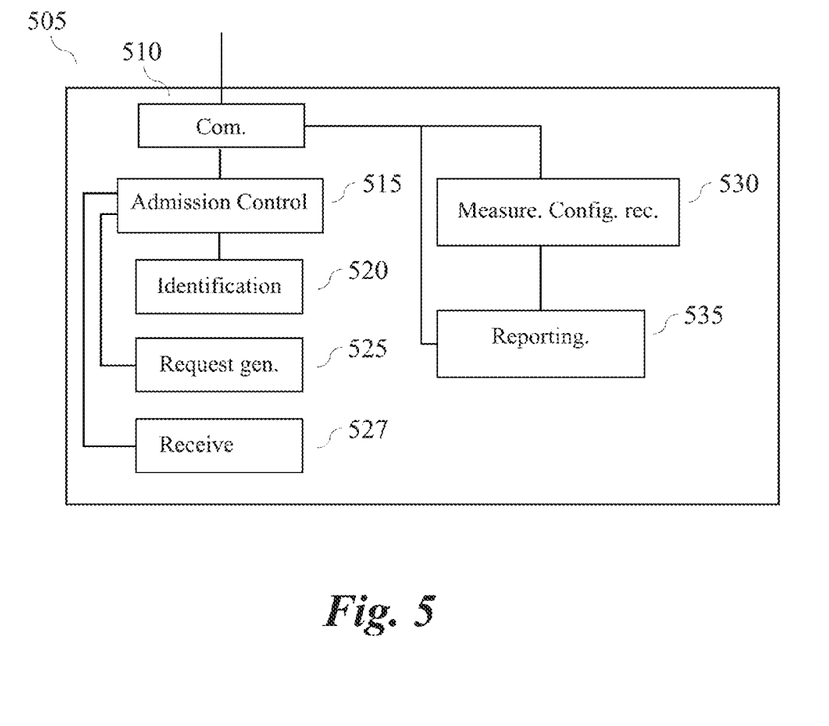
FIG. 5 illustrates schematically a network node according to the invention.

A network node 505 according to the present invention is schematically illustrated in FIG. 5. The network node 505 is provided with respective means for carrying out the method described above, and is adapted to be part of a mobile communication network. The modules and blocks according to the present invention are to be regarded as functional parts of the node and not necessarily as physical objects by themselves. The modules and blocks are preferably at least partly implemented as software code means, to be adapted to effectuate the method according to the invention. The term "comprising" does primarily refer to a logical structure and the term "connected" should here be interpreted as links between functional parts and not necessarily physical connections. However, depending on the chosen implementation, certain modules may be realized as physically distinctive objects in a network node. It should also be noted that the design of modern access networks offers a great deal of flexibility in there a specific function is executed. Hence, it should be understood that a function or module could reside in one node, but logically, for the functionality here described, belong to the network node 505.

The radio network node 505 comprises a communication module 510 adapted for communication with other nodes of a network. According to the invention the network node 505 comprises an admission control module 515 adapted to perform at least part of the RRM functionality required in the communication network. The radio network node 505 further comprises an interface and node identification module 520, adapted to identify which interface, or interfaces, and to them related node or nodes, that are relevant for a current admission control. The admission control module 515 further comprises a measurement configuration request generation module 525, adapted to form a measurement configuration request. The communication module 510 is adapted to transfer the measurement configuration request formed by the measurement configuration request generation module 525 to a further node identified by the node identification module 520. The admission control module 515 further comprises a receiving module 527 adapted to receive measurement reports from a node that has been requested to perform and report measurements. The admission control module 515 is adapted to use the reported measurements as an input for the admission control.

The network node 505 preferably also comprises a measurement configuration receiving module, 530 adapted to receive and execute a measurement configuration request, and a report generating module 535 adapted to produce an measurement report according to a received measurement configuration request. The communication module 510 is preferably adapted to transfer a measurement to the network node that issued the measurement configuration request.

The network node 505 is described as comprising means relating to both admission control and to receive and to execute measurement configurations. This represents a preferred embodiment of the invention, as a network node 505, for example a Node B, may take the role as both as requesting and receiving transport load measurement, and as performing and reporting of the transport load measurements. However, it should be understood that a network node according to the invention may comprise only the means relating to admission control, or the means relating to the performing and reporting of the transport load measurements.

The method according to the present invention may be implemented, at least in parts, by means of program products or program module products comprising the software code means for performing the steps of the method. The program products are preferably executed on a plurality of entities within a network. The program is distributed and loaded from a computer usable medium, such as a USB-memory, a CD, or transmitted over the air, or downloaded from Internet, for example.

The method and arrangement according to the invention is also applicable to other communication systems such as WCDMA. In this case if admission control is done by the radio network controller RNC, which is the case in WCDMA, then the RNC will configure the Node B to report the downlink transport network load (i.e. the packet loss rate on Iub interface). As a result the Node B shall measure the downlink packet loss rate and report it using the similar measurement and reporting principles as described in the foregoing with reference to interface S1-U in E-UTRAN. This invention also applies to the transport network load estimation over Abis and A interfaces in GSM or other GSM based technologies such as EDGE Radio Access Network (GERAN), where EDGE stands for Enhanced Data rates for GSM Evolution. In GSM/GERAN the radio interface bit rate has also been dramatically evolved leading to bottleneck on the incumbent fixed transport network interfaces: Abis and A. The 'Abis' interface is used between the base station and the base station controller (BSC), whereas A interface is used between BSC and mobile switching center (MSC). In GSM/GERAN admission control is mainly done at the BSC. Therefore base station will have to report the downlink transport network load of the Abis interface to the BSC. This will require the BSC to configure the base station for measurement reporting. The uplink load on the Abis can be estimated by the BSC itself.

The method and arrangement according to the invention has been described as used primarily in a communication setup scenario wherein a node performs an admission control. The method and arrangement may also be used for long term measurements for operation and maintenance purposes. The serving radio network node may for example store network transport load data for different interfaces and report to an O&M node in the network. The reported measurement data can for example be used to compare the relation, and identify a possible mismatch, between loads on the air interface and the transport network interface. The comparison can indicate if a bottleneck exists in the total communication chain, and which interface is the bottleneck. Such identifications are of value in the planning, dimensioning and configuration of the mobile communication network, especially the backhaul part of the network. Furthermore, an operator is able to maintain the right balance between the radio resources used over the radio interface and the transport network resources. The detailed logged data via O&M can also be used for the network maintenance and for tracking any faults in the network.

The invention involves clear rules, which may facilitate interoperability issues between different vendors. Furthermore, it is possible to use tunable parameters to configure measurement and reporting event, which leads to flexibility and improves the measurement confidence level. The invention allows the admission control process to take into consideration the availability of both radio network and transport network resources, which in turn ensure an establishment of a optimal communication link from both radio network and transport network perspectives. On the one hand it enables an operator to ensure that the desired end-to-end grade of service is met. Secondly, on the average transport network resources are evenly used since admission control would redirect a connection to less loaded interface.

While the invention has been described in connection with what is presently considered to be the most practical and preferred embodiments, it is to be understood that the invention is not to be limited to the disclosed embodiments, on the contrary, it is intended to cover various modifications and equivalent arrangements within the appended claims.

The invention claimed is:

1. A method, performed by a radio network node in a wireless communication network, for detecting the load on transport network interfaces as an input for a radio resource management (RRM) function, wherein the radio network node is part of a transport network, functions as a serving radio network node, and is responsible for performing the RRM function, the method comprising:
the serving radio network node identifying a transport network interface from which transport load measurements are required for the RRM function, and a target radio network node associated with the identified transport network interface;
the serving radio network node requesting the target radio network node to perform transport load measurements on the identified transport network interface, the request specifying measurement parameters and reporting conditions for the target radio network node;
the serving radio network node receiving the measurement results from the target radio network node when the reporting conditions are fulfilled;
the serving radio network node basing performance of the RRM function at least partly on the received measurement results; and
the serving radio network node storing long-term network transport load data that is used to identify a mismatch between loads on the air interface and the transport network interface;
wherein the transport network includes resources on a fixed part of a radio access network portion of the wireless communication network.

2. The method of claim 1 wherein a transport network load is expressed in terms of packet loss rate.

3. The method of claim 2 wherein one or more missing sequence numbers of transmitted packets are used to measure the packet loss rate.

4. The method of claim 3 wherein the transport network utilizes a plurality of transport network bearer services, and wherein the transport network load is separately measured for each transport network bearer service.

5. The method of claim 2 wherein the transport network utilizes a plurality of transport network bearer services, and wherein the transport network load is separately measured for each group of transport network bearer services having similar characteristics.

6. The method of claim 5 wherein the similar characteristics comprise quality of service requirements.

7. The method of claim 2 wherein the transport network load is measured as an aggregation of all the transport network bearer services.

8. The method of claim 1 wherein the request sent by the serving radio network node specifies one or more of the following measurement parameters: basic measurement interval, measurement filtering, reporting condition, transport bearer, and flow type.

9. The method of claim 8 wherein the measurement parameters and reporting conditions are default values that are pre-configured in the transport network.

10. The method of claim 8 further comprising determining, at the serving radio network node, the measurement parameters and reporting conditions.

11. The method of claim 8 wherein the request sent by the serving radio network node specifies measurement filtering parameters comprising one or more of a number of successive measurement intervals, a minimum number of packets to be measured in each interval, and whether filtering averaging is linear or non-linear.

12. The method of claim 8 wherein the request sent by the serving radio network node specifies reporting condition parameters comprising one or more of a number of measurement intervals M, and a minimum number of packets N to be measured in an interval, and a packet loss rate threshold $\gamma$, which specifies a level for which measurements should be reported.

13. The method of claim 8 wherein a flow type, comprised of a transport bearer service, a group of transport bearers, or an aggregated flow for which the measurement is performed, is specified.

14. The method of claim 1:
wherein the serving radio network node is a base station, and the target radio network node is an access gateway in an Evolved Universal Mobile Telecommunication Communication System Terrestrial Radio Access Network (E-UTRAN); and
wherein requesting the target radio network node to perform transport load measurements on the identified transport network interface comprises the base station requesting the access gateway to measure the uplink transport network load on the interface between the base station and the access gateway, and report to the base station.

15. The method of claim 1:
wherein the serving radio network node is an access gateway in an Evolved Universal Mobile Telecommunication Communication System Terrestrial Radio Access Network (E-UTRAN), and the target radio network node is a base station; and
wherein requesting the target radio network node to perform transport load measurements on the identified transport network interface comprises requesting the base station to measure the downlink transport network load on the interface between the base station and the access gateway, and report to the access gateway.

16. The method of claim 1:
wherein the serving radio network node is a serving base station and said target radio network node is a second base station; and
wherein requesting the target radio network node to perform transport load measurements on the identified transport network interface comprises the serving base station requesting the second base station to measure the transport network load on the interface between the base stations, and to report to the serving base station.

17. The method of claim 1:
wherein the serving radio network node is one of an MBMS access gateway and an MBMS server in an Evolved Universal Mobile Telecommunication Communication System Terrestrial Radio Access Network (E-UTRAN), and the target radio network node is a base station; and
wherein requesting the target radio network node to perform transport load measurements on the identified transport network interface comprises the one of the MBMS access gateway and the MBMS server requesting the base station to measure the downlink transport network load on the interface between base station and the one of the MBMS access gateway and the MBMS server, and to report to the one of the MBMS access gateway and the MBMS server.

18. The method of claim 1:
wherein the serving radio network node is a base station and the target radio network node is one of an MBMS access gateway and an MBMS server in an Evolved Universal Mobile Telecommunication Communication System Terrestrial Radio Access Network (E-UTRAN); and
wherein requesting the target radio network node to perform transport load measurements on the identified transport network interface comprises the base station requesting the one of the MBMS access gateway and the MBMS server to measure the uplink transport network load on the interface between the base station and the one of the MBMS access gateway and the MBMS server, and to report to the base station.

19. The method of claim 1:
wherein the serving radio network node is a radio network controller (RNC) in an Universal Mobile Telecommunication Communication System Terrestrial Radio Access Network (UTRAN), and the target radio node is a base station; and
wherein requesting the target radio network node to perform transport load measurements on the identified transport network interface comprises the RNC requesting the base station to measure the downlink transport network load on the interface between the base station and the RNC, and to report to the RNC.

20. The method of claim 1:
wherein the serving radio network node is a base station controller in one of a Global System for Communications (GSM) network and a GSM Enhanced Data rates for GSM Evolution Radio Access Network (GERAN) and the target radio network node is a base station; and
wherein requesting the target radio network node to perform transport load measurements on the identified transport network interface comprises base station controller requesting the base station to measure the downlink transport network load on the interface between the base station and the base station controller, and to report to the base station controller.

21. The method of claim 1 wherein requesting the target radio network node to perform transport load measurements on the identified transport network interface comprises the serving radio network node requesting the target radio network node to report the transport network load measurement via a control plane over a channel that carries control information.

22. The method of claim 1 wherein requesting the target radio network node to perform transport load measurements on the identified transport network interface comprises the serving radio network node requesting the target radio network node to report the transport network load measurement piggy-backed with user data via a user plane over a channel that carries user data.

23. The method of claim 1 wherein the reporting condition comprises a threshold above which measurements should be reported whereby the reporting of the measurements is event-triggered.

24. A radio network node configured to function as a serving node in a radio communication network, and comprising:
a radio resource management (RRM) function module configured to perform a RRM function required in the radio communication network;

an interface and node identification module configured to identify a transport network interface and a node associated with the interface that are relevant for performance of the RRM function;

a measurement configuration request generation module configured to form a measurement configuration request comprising measurement parameters, to be transferred to the node identified by the transport network interface and node identification module;

a receiving module configured to:
  receive measurement reports from the node that has been requested to perform and report measurements; and
  provide the reported measurements to the RRM function module; and a storage module configured to store long-term network transport load data that is used to identify a mismatch between loads on the air interface and the transport network interface;

wherein the transport network includes resources on a fixed part of a radio access network portion of the radio communication network.

25. The radio network node of claim 24 further comprising:

a measurement configuration receiving module configured to receive and execute a measurement configuration request; and a report generating module configured to produce a measurement report according to a received measurement configuration request.

26. A method, performed in a radio network node, for detecting the load on transport network interfaces at admission control, wherein the radio network node is part of a transport network functioning as a serving radio network node, and is responsible for performing admission control, the method comprising:

the serving radio network node identifying a transport network interface from which transport load measurements are required for admission control, and a target radio network node associated with the identified transport network interface;

the serving radio network node requesting the target radio network node to perform transport load measurements on the identified transport network interface, the request specifying measurement parameters, filtering parameters, and reporting conditions for the target radio network node;

the serving radio network node receiving the measurement results from the target radio network node when the reporting conditions are fulfilled;

the serving radio network node basing the admission control at least partly on the received measurement results; and determining, at the serving radio network node, the measurement parameters and reporting conditions;

wherein the measurement parameters include one or more of the basic measurement interval, measurement filtering, reporting condition, transport bearer, and flow type; and wherein the filtering parameters comprise one or more of a number of successive measurement intervals, a minimum number of packets to be measured in each interval, and whether filtering averaging is linear or non-linear.

27. The method of claim 26 wherein the request sent by the serving radio network node specifies reporting condition parameters comprising one or more of a number of measurement intervals M, and a minimum number of packets N to be measured in an interval, and a packet loss rate threshold $\gamma$, which specifies a level for which measurements should be reported.

28. The method of claim 26 wherein a flow type, comprised of a transport bearer service, a group of transport bearers, or an aggregated flow for which the measurement is performed, is specified.

29. A method, performed in a radio network node, for detecting the load on transport network interfaces at admission control, wherein the radio network node is part of a transport network functioning as a serving radio network node, and is responsible for performing admission control, the method comprising:

the serving radio network node identifying a transport network interface from which transport load measurements are required for admission control, and a target radio network node associated with the identified transport network interface;

the serving radio network node requesting the target radio network node to perform transport load measurements on the identified transport network interface, the request specifying measurement parameters, and reporting conditions for the target radio network node;

the serving radio network node receiving the measurement results from the target radio network node when the reporting conditions are fulfilled;

the serving radio network node basing the admission control at least partly on the received measurement results; and the serving radio network node storing long-term network transport load data that is used to identify a mismatch between loads on the air interface and the transport network interface.

* * * * *

UNITED STATES PATENT AND TRADEMARK OFFICE
CERTIFICATE OF CORRECTION

| | | |
|---|---|---|
| PATENT NO. | : 9,438,521 B2 | Page 1 of 2 |
| APPLICATION NO. | : 12/443198 | |
| DATED | : September 6, 2016 | |
| INVENTOR(S) | : Kazmi et al. | |

It is certified that error appears in the above-identified patent and that said Letters Patent is hereby corrected as shown below:

In the Specification

In Column 1, Line 26, delete "Communication System." and insert -- System. --, therefor.

In Column 1, Line 39, delete "refereed" and insert -- referred --, therefor.

In Column 3, Line 12, delete "steps of" and insert -- steps of: --, therefor.

In Column 4, Line 43, delete "means for" and insert -- means for: --, therefor.

In Column 5, Lines 15-16, delete "reporting." and insert -- reporting; and --, therefor.

In Column 5, Line 21, delete "DESCRIPTION" and insert -- DETAILED DESCRIPTION --, therefor.

In Column 6, Line 36, delete "measurement." and insert -- measurement, --, therefor.

In Column 7, Line 10, delete "met." and insert -- met: --, therefor.

In Column 7, Line 47, delete "Si" and insert -- S1 --, therefor.

In Column 7, Lines 49-50, delete "an Node B" and insert -- a Node B --, therefor.

In Column 7, Line 52, delete "Si" and insert -- S1 --, therefor.

In Column 9, Line 62, delete "a optimal" and insert -- an optimal --, therefor.

In the Claims

In Column 11, Line 23, in Claim 14, delete "Communication system" and insert -- system --, therefor.

Signed and Sealed this
Tenth Day of January, 2017

Michelle K. Lee
*Director of the United States Patent and Trademark Office*

CERTIFICATE OF CORRECTION (continued)
U.S. Pat. No. 9,438,521 B2

In Column 11, Line 35, in Claim 15, delete "Communication system" and insert -- system --, therefor.

In Column 11, Lines 57-58, in Claim 17, delete "Communication system" and insert -- system --, therefor.

In Column 12, Lines 7-8, in Claim 18, delete "Communication system" and insert -- system --, therefor.

In Column 12, Line 22, in Claim 19, delete "Communication system" and insert -- system --, therefor.